A. BRIDGE.
SEA WATER BATTERY FOR VESSELS.
APPLICATION FILED MAY 29, 1919.
1,332,483. Patented Mar. 2, 1920.
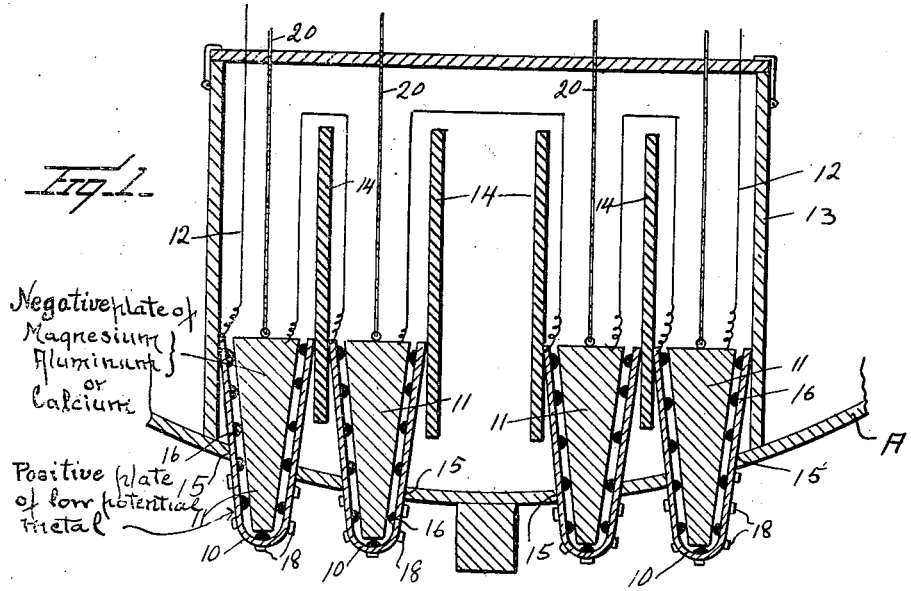
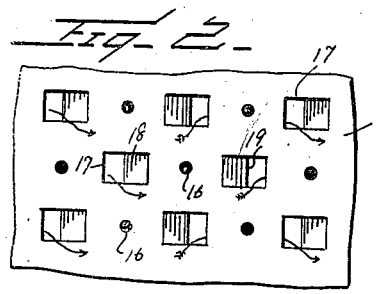
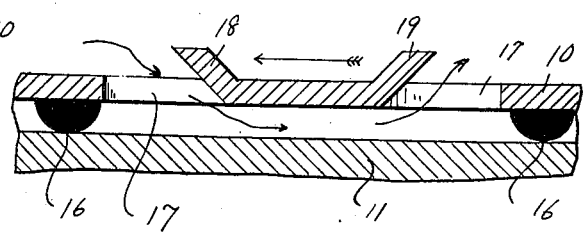
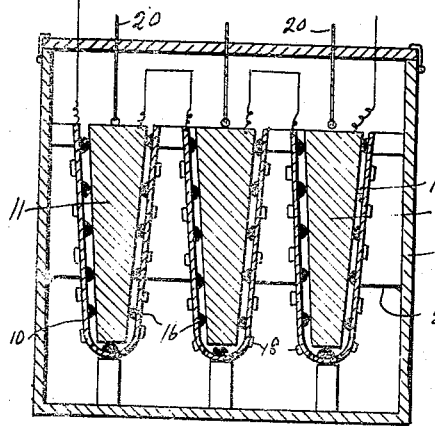
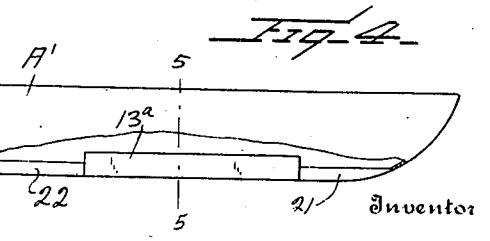

UNITED STATES PATENT OFFICE.

ARTHUR BRIDGE, OF WASHINGTON, DISTRICT OF COLUMBIA.

SEA-WATER BATTERY FOR VESSELS.

1,332,483.  Specification of Letters Patent.  Patented Mar. 2, 1920.

Application filed May 29, 1919. Serial No. 300,588.

*To all whom it may concern:*

Be it known that I, ARTHUR BRIDGE, a citizen of the United States, residing at Washington, in the District of Columbia, have invented certain new and useful Improvements in Sea-Water Batteries for Vessels, of which the following is a specification, reference being had to the accompanying drawings.

This invention relates to electric batteries, and primarily the object of the invention is to provide a primary battery so mounted upon a vessel that a continuous supply of electrolyte may be provided by so mounting the plates of the battery that salt water may pass continuously between the plates.

And a further object is to provide a battery of this character wherein the generating or negative plates may be lowered into the salt water acting as the electrolyte or may be raised out of this salt water, thus preventing chemical reaction during the time when the electric current is not needed, and also permit the scouring and removal of any obstructions from the positive plates when necessary.

A further object is to provide a primary battery which is particularly suitable for use with submarine boats, in that it will do away with the necessity of recharging the battery, as is the case where secondary batteries are used, and further because the electrolyte will always be fresh.

And a further object is to provide a construction of this kind in which the plates can be kept constantly cleaned by the action of the salt water flowing between the plates.

Other objects will appear in the course of the following description.

My invention is illustrated in the accompanying drawings, wherein:—

Figure 1 is a vertical fragmentary sectional view of a vessel with my battery applied thereto;

Fig. 2 is a fragmentary side elevation of one of the positive battery plates showing the perforations therein;

Fig. 3 is a longitudinal enlarged section of a portion of the positive plate and the adjacent negative plate;

Fig. 4 is a diagrammatic side elevation of a boat with a battery applied thereto; and Fig. 5 is a vertical section of the battery on line 5—5 of Fig. 4.

Referring to these drawings, it will be seen that my invention consists in disposing in connection with a vessel A, which is illustrated diagrammatically in the drawings, a battery comprising a plurality of generating plates of material such that they will be electrically and chemically acted upon by sea water as an electrolyte. These plates are spaced from each other in any suitable manner and electrically connected to each other as shown. I have illustrated these plates as 10 being the positive plate and 11 the negative plate. The negative plates can be metallic magnesium, aluminum, calcium, or electrolytic iron which are materials acted upon by salt water to produce an electric current, the choice of material depending upon the cost and quantity of the metal needed to produce the current. Where aluminum is used, aluminum having a sodium content which would render it unfit for use as a material for utensils or other purposes, could be used to advantage as battery plates, for sodium aluminate is soluble in water, while pure aluminum oxid is practically insoluble. The positive plates may be of copper or other low potential metal, or may be of iron plated with copper, silver or other low potential metal, these plates 10 and 11 having conducting wires 12 leading from their opposite poles, the plates being disposed so as to project through the side or hull of the vessel so that salt water may have access thereto and to pass freely through the spaces between the plates. In Fig. 1 these plates are shown as disposed in a box or casing 13 forming a cell extending over the keel of the vessel, though I do not wish to be limited to this. This box or casing is open at its bottom and rests upon the hull of the vessel, and the box or casing is divided into a plurality of compartments by means of a wooden, composition or other non-conductive partition 14. The hull of the vessel is formed with apertures 15 disposed below or in alinement with the spaces between the partitions 14 and disposed within each of these spaces is an approximately U-shaped, positive plate 10, and between the sides of this positive plate 10 (which U-shaped plate is practically two plates of copper or other low potential metal connected to each other by an integral connection) there is disposed a wedge-shaped or downwardly tapered, negative plate 11.

The negative plate may be held spaced and insulated from each other in any suitable manner, but as illustrated the positive plate is formed with bosses of insulating material 16 which hold the negative plate in spaced relation to the inner faces of the positive plates or plate, and these positive plates are upwardly divergent to form a rack for the wedge-shaped negative plates. These positive plates project through the openings 15 and substantially fill these openings, and the positive plates are perforated at a plurality of points to permit the inlet of sea water to the space between the positive plate and the negative plate and permit a circulation of sea water in this space. To this end, I have shown the positive plate 10 as being perforated at intervals to form coacting, deflected tongues 18 and 19, these tongues being bent outward in diverging relation, as illustrated in Fig. 3, so that sea water entering one of the perforations 17 will be deflected inward to the space between the positive plate and the negative plate and then will be deflected outward again, so that a scouring action is secured by the current of sea water upon the plates. The perforations in the bottom or detour of the positive plates are without the tongues 18 and 19, causing more of an egress than ingress of water at the bottom.

Greatest electro-chemical action will occur at the lower or tapered edge of the negative plate, and as the negative plate is eaten away it will lower itself or shift downward under the action of gravity between the walls or positive plates on each side. Means such as cables may be attached to these negative plates, whereby they may be removed for the insertion of other negative plates. Such cables I have illustrated diagrammatically and numbered 20.

It will be seen that by the means described a copious supply of salt water is secured for circulating between the positive and negative plates, and it will be further seen that by the means described, it is possible to use primary batteries on a vessel in place of secondary batteries, thus avoiding the necessity of recharging the batteries from a dynamo, as the negative plates can be replaced by new ones as needed and there would be no delay in the operation of the boat so long as the supply of magnesium aluminum, etc., was on hand and sea water was available. Furthermore, the electrolyte would maintain its standard of strength at all times, and furthermore the passage of the boat through the water would cause the plates to be kept clean by the action of the current of water, thus avoiding polarization of the plates.

Magnesium can now be manufactured in relatively large quantities at a relatively low cost, and thus magnesium plates may be used in connection with copper to form primary cells, as before described. Because of the high ionic pressure of magnesium and because magnesium oxid is somewhat soluble, sea water alone may be used for the electrolyte. The circulation of the sea water, as before remarked, would prevent polarization and remove the oxid of magnesium.

It will be seen that by my invention I provide a very simple form of battery particularly adapted for use by vessels, whether submersible or not, and it will be obvious that I do not wish to be limited to the particular construction illustrated or the particular means whereby I secure a circulation of sea water between the plates. Thus, in Fig. 5 I have illustrated another embodiment of my invention wherein the plates 10 and 11 are disposed within a casing 13$^a$, this casing being disposed in a vessel A', the casing 13$^a$ having at one end a relatively large induction pipe 21 and at the opposite end a relatively large outlet pipe 22, the induction pipe leading through the bow of the vessel and the outlet pipe discharging at any desired position so that as the vessel moves forward or rearward, the sea water will be caused to circulate swiftly through the space between the plates, thus providing a copious supply of electrolyte of full strength at all times, this electrolyte scouring the plates and thus preventing polarization of the plates.

It is obvious from the above that I do not wish to be limited to the particular mechanism of carrying out my invention into effect, and it will further be understood that the drawings are to a large extent diagrammatic and merely illustrative of the broad idea of my invention, particularly as regards the setting of the battery within the vessel.

I claim:—

1. An electric battery including a cell, positive and negative battery plates disposed within said cell, one set of plates being arranged in upwardly divergent relation, each plate of the other set of plates being tapering and disposed each between each two upwardly divergent plates, whereby the tapering plates will feed downward between the upwardly divergent plates.

2. A battery including an electrolyte containing cell and coacting negative and positive battery plates therein, one of said plates being vertically disposed and downwardly tapering, the other plates being arranged on each side of the first named plate and extending upwardly and outwardly parallel to the side faces thereof, whereby the first named plate may feed downward by gravity between the second named plates, and means whereby the first named plate may be lifted upward with relation to the second named plates.

3. Means for producing electric current including an electric cell having therein coacting plates of magnesium and copper, the magnesium plates tapering in one direction and there being copper plates on each side of a magnesium plate and arranged in convergent relation, and means whereby salt water may be caused to circulate through the cell.

4. The combination with a vessel, of means for producing an electric current comprising a cell mounted on the vessel, and battery elements disposed in said cell of material adapted to be acted on by salt water as an electrolyte to produce electric current, and means whereby sea water may be caused to flow continuously from the body of sea water surrounding the vessel into and through the space between the elements and be discharged into the surrounding body of water.

5. The combination with a vessel, of a casing therein opening to the exterior of the vessel below the water line, and battery elements of material acted upon by sea water to produce an electric current disposed in said casing, the casing and plates being so formed as to cause a current of salt water to pass through the casing and circulate between the elements as the vessel moves through the water.

6. The combination with a vessel, means for producing electric current, comprising coacting plates of material adapted to be acted upon by sea water as an electrolyte to produce electric current, said plates projecting through the hull of the vessel whereby a current of sea water may be caused to pass between the plates upon movement of the vessel.

7. The combination with a vessel, of means for producing an electric current comprising battery elements, one of said elements being U-shaped in cross section and projecting through the hull of the vessel into the exterior sea water and being perforated, the other element being disposed between the sides of the U-shaped element and spaced therefrom, the elements being such as to develop an electric current with sea water as an electrolyte.

8. The combination with a vessel, of means for producing an electric current comprising coacting battery plates, one of said plates being U-shaped in cross section and extending through the hull of the vessel to the exterior thereof and being formed with perforations having deflecting tongues to cause sea water to pass into and circulate through the space bounded by said U-shaped element, the other element being disposed within the U-shaped element and held in spaced relation thereto.

9. The combination with a vessel, of means for producing an electric current, comprising coacting battery elements, one of said elements being U-shaped in form and extending through the hull of the vessel and being perforated for the admission of sea water, the sides of said element converging inward and having bosses on its inner face of non-conducting material, and the other element tapering in cross section and being disposed within the U-shaped element and resting against said bosses and feeding downward as it is used.

10. The combination with a vessel, of a casing therein opening to the exterior of the vessel below the water line, and battery elements of material acted upon by sea water to produce an electric current disposed in said casing the casing and vessel being so formed as to permit a current of sea water to pass from the exterior of the vessel through the casing and circulate between the elements and permit said sea water, after such circulation, to pass out of the casing.

In testimony whereof I hereunto affix my signature in the presence of two witnesses.

ARTHUR BRIDGE.

Witnesses:
  FREDERIC B. WRIGHT,
  ROBERT A. BOSWELL.